Sept. 24, 1963　　　M. W. KLAUSNER　　　3,105,107
PHOTOELECTRIC DEVICE FOR MEASURING LIGHT OUTPUT
VALUES IN PHOTO-PRINTING MACHINES
Filed June 3, 1958
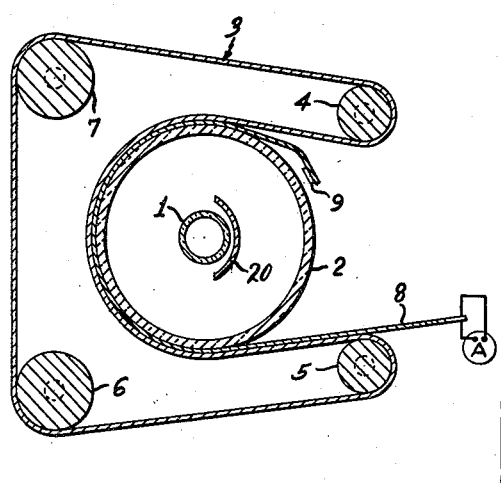
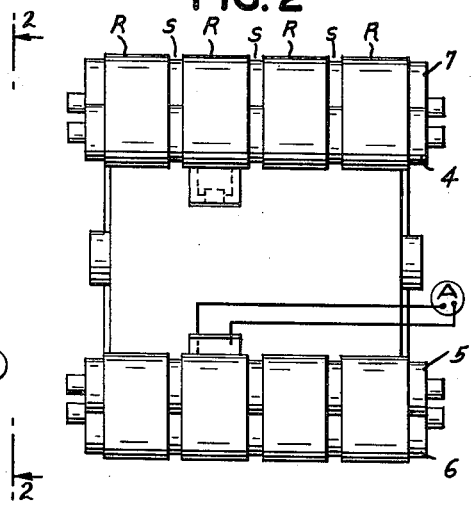
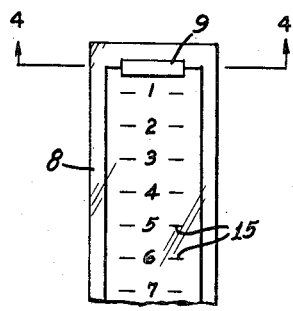
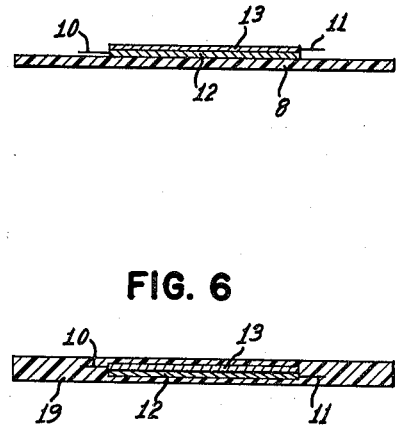
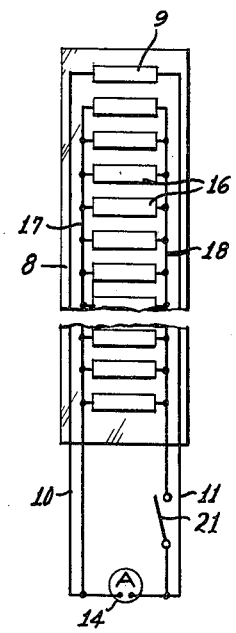
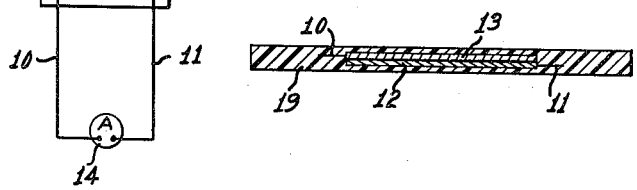
INVENTOR.
MELVIN W. KLAUSNER
BY
ATTORNEYS United States Patent Office 3,105,107
Patented Sept. 24, 1963

3,105,107
PHOTOELECTRIC DEVICE FOR MEASURING LIGHT OUTPUT VALUES IN PHOTO-PRINTING MACHINES
Melvin W. Klausner, North Bergen, N.J., assignor to Engelhard Hanovia, Inc., a corporation of New Jersey
Filed June 3, 1958, Ser. No. 739,507
1 Claim. (Cl. 88—23)

The present invention deals with a measurement device for photo-printing machines and more particularly with a device for measuring light output values of lamps employed in photo-printing machines.

In photo-printing machines designed for the exposure of engineering reproduction materials, such as positive working diazo type papers, both dry and moist developing, the material to be exposed is positioned, together with the drawing or tracing to be copied, on a moving endless belt or a plurality of belts and fed over a rotatable drum or rotating glass cylinder, or a convex cylindrical surface of a transparent glass sheet, or semi-tubular member, or the like, and exposure is effected by means of a light source positioned therein. The endless belt or belts move over a series of rollers and convey the tracing and light sensitive material over the cylindrical surface. During exposure, the belt or belts hold the printing material in contact with the cylindrical transparent surface while passing thereover.

The light source for the photo-machines is in the form of an elongated tube for emitting high intensity ultra violet radiations.

While the lamp registers an even light intensity under laboratory test conditions prior to assembly in the machine, it may give an uneven output under actual operating conditions as a result of electrical imperfections in the machine itself, a dirty drum, or some mechanical interception to the emitted light.

It is extremely difficult to measure the light output of the lamp under photo-machine operating conditions without dismounting the lamp.

One method of testing light output is to pass and expose a strip of photo-sensitive printing paper through the machine at both ends and the center of the rotating drum and to observe if any difference in shading occurs among the exposed strips. It is extremely difficult to visually ascertain shading differences within a degree of desirable accuracy. Consequently, the machine may be unnecessarily operating below peak efficiency.

It is an object of the present invention to provide a device for measuring the light output of photo-printing lamps under operating conditions. It is another object of the invention to provide a device for measuring light output of photo-printing machines without dismounting the source of light. It is another object of the present invention to provide a device for electrically measuring the light output of a photo-printing lamp during operation of the photo-printing machine. Other objects and advantages of the invention will become apparent from the description hereinafter following and the drawings forming a part hereof, in which:

FIGURE 1 is a cross sectional and schematic view of a conventional photo-printing machine including conveyor belts and a light source, FIGURE 2 is a front view of FIGURE 1 along lines 2—2 of FIGURE 1, FIGURE 3 is a top plan view of a measuring device according to the invention for measuring the light output of a photo-printing machine, FIGURE 4 is an enlarged cross-sectional view along lines 4—4 of FIGURE 3, FIGURE 5 is a top view of a modification of the device according to the present invention, and FIGURE 6 is a cross-sectional view of another modification according to the invention.

The invention deals with a device for measuring the light output of photo-printing lamps during actual operation of the photo-printing machine incorporating the lamps, whereby a strip member having a photocell sensing member and conductor means therefor is passed through the machine in exposed relationship to the light radiation.

FIGURES 1 and 2 illustrate a conventional photo-printing machine system and associated members, including a source of light 1 within a transparent cylinder 2. An endless belt system 3 is moved over rollers 4, 5, 6, 7, at least one of which may be driven by a driving means. The rollers are arranged to permit the belt system 3 to engage the convex surface of the cylinder 2, which, for example, is mounted for rotation about the source of light. A measuring device 8, hereinafter more particularly described and including a photocell member 9, is fed around the convex cylindrical surface of cylinder 2 for exposure of photocell member 9 to the said light source, said belt system pressing the device 8 against the convex surface during passage thereover.

The belt system is composed of a plurality of parallel belts R with spacings S therebetween.

The invention relates to a measuring device applicable for the measurement of light output of a lamp mounted in a photo-printing machine such as illustrated by FIGURES 1 and 2, the measuring device being illustrated by FIGURES 3 to 6.

Referring to FIGURES 3 and 4, the device comprises a longitudinal sheet or strip 8 having a light sensitive unit 9 affixed thereto, preferably at an end portion thereof, and electrical conductors 10 and 11 connected to the light sensitive unit and extending longitudinally of the strip 8. The sheet or strip 8 is composed of a flexible material, preferably a light transmissive plastic material, and the light sensitive unit 9 is a substantial conventional type photocell capable of transforming light into electrical energy.

For example, the photocell comprises a base metal layer 12, such as aluminum, bonded to a layer of light sensitive metal 13, preferably selenium, the conductor 10 being electrically connected to the base metal layer and the conductor 11 being connected to the selenium layer. The layer of selenium may be coated on a thin base metal, such as aluminum, iron, nickel, etc., by vacuum evaporation or pasting and subsequently heat treated. The conductors 10 and 11, positioned longitudinally of the strip 8, are connected to an electrical indicating means or ammeter 14. The strip 8 is provided with indicia 15 spaced from each other longitudinally of the strip. FIGURE 5 illustrates a modification of FIGURE 1 wherein a plurality or bank of photocells 16 are spaced longitudinally of strip 8 and connected in parallel to conductors 17 and 18. The bank of photocells 16 may be connected in electrical series instead of in parallel electrical arrangement with functional equivalency. The photocell 9 and photocells 16 are connected to ammeter 14.

FIGURE 6 shows another modification of the invention similar to that of FIGURE 4 as to like components, except that the photocell components 12 and 13 and conductors 10 and 11 are imbedded in a light transmissive flexible plastic strip 19. The ends of the conductors 10 and 11 extend outwardly of the strip as illustrated by FIGURE 3. The plurality of photo-cells 9 and 16 and conductors 10, 11, 17 and 18 may be also imbedded in a plastic strip similar to that illustrated by FIGURE 6.

In operation the flexible strip 8 of FIGURE 3, having a photocell 9 and conductors 10 and 11 mounted thereon and with the conductors connected to ammeter 14, is inserted into the photo machine with the photocell passing between the cylindrical tube and belt system 3 of FIG- URES 1 and 2. As the photocell passes around the cylinder tube, periodic readings of photocell response, at the locations of indicia 15, are taken from the ammeter 14. Since the light of the light source 1 is customarily shielded and localized, e.g. by means of a reflector 20, the readings show a variation of light intensity over the cylinder 2 and the readings are averaged for comparison with a standard. A deviation of the average reading from the standard indicates that the lamp 1 is not operating at peak efficiency.

When the measuring device according to FIGURE 5 is employed, and with the switch 21 open, the device operates similarly to that of FIGURE 3. However, when switch 21 is closed, and because the photocells 16 are connected to the ammeter 14 by means of conductors 17 and 18, the response of each photocell is collectively additive and the reading of the ammeter is an automatic average reading. Should the average reading deviate from a standard comparison value, the lamp is operating below peak efficiency and corrective measures are indicated.

The ammeter 14 may be replaced by an electrical output recording apparatus to provide a record of the cell response for future reference against which subsequent readings are taken to determine decline of lamp efficiency with use.

While the invention has been specifically described and illustrated, various modifications are contemplated within the scope of the appended claim.

What is claimed is:

A light responsive measuring device comprising a thin elongated flexible light transmissive sheet, a thin photoelectric member affixed to and localized at one end portion of the sheet, electrical conductor means connected to the photoelectric member and positioned longitudinally of the sheet and extending from the photoelectric member at the said one end portion of the sheet toward the other end thereof, and a photoelectric response measuring means electrically connected to the conductor means.

References Cited in the file of this patent

UNITED STATES PATENTS

| | | |
|---|---|---|
| 888,801 | Hammer | May 26, 1908 |
| 888,802 | Hammer | May 26, 1908 |
| 1,953,471 | Eich | Apr. 3, 1934 |
| 2,183,256 | Gabler | Dec. 12, 1939 |
| 2,201,606 | Bing | May 21, 1940 |
| 2,305,576 | Lamb | Dec. 15, 1942 |
| 2,330,877 | Fleisher et al. | Oct. 5, 1943 |
| 2,342,245 | Bruce et al. | Feb. 22, 1944 |
| 2,636,992 | Aicher | Apr. 28, 1953 |
| 2,962,539 | Daniel | Nov. 29, 1960 |

FOREIGN PATENTS

| | | |
|---|---|---|
| 331,022 | Switzerland | Aug. 15, 1958 |